(12) United States Patent
Jüptner

(10) Patent No.: US 7,534,851 B2
(45) Date of Patent: May 19, 2009

(54) METHOD FOR PURIFYING WASTEWATER

(75) Inventor: Günter A. Jüptner, Niedersachsen (DE)

(73) Assignee: Dow Global Technologies, Inc., Midland, MI (US)

( * ) Notice: Subject to any disclaimer, the term of this patent is extended or adjusted under 35 U.S.C. 154(b) by 240 days.

(21) Appl. No.: 10/547,581

(22) PCT Filed: Jan. 21, 2004

(86) PCT No.: PCT/US2004/001644

§ 371 (c)(1),
(2), (4) Date: Apr. 24, 2006

(87) PCT Pub. No.: WO2004/078657

PCT Pub. Date: Sep. 16, 2004

(65) Prior Publication Data

US 2006/0226078 A1 Oct. 12, 2006

Related U.S. Application Data

(60) Provisional application No. 60/452,442, filed on Mar. 5, 2003.

(51) Int. Cl.
*C08G 63/02* (2006.01)
*C08G 63/00* (2006.01)

(52) U.S. Cl. .................. 528/196; 210/638; 210/639; 210/774; 210/806; 210/909

(58) Field of Classification Search ............... 210/638, 210/639, 774, 806, 909; 524/502, 508; 528/196, 528/198
See application file for complete search history.

(56) References Cited

U.S. PATENT DOCUMENTS

| 4,400,553 | A | | 8/1983 | Aneja | |
|---|---|---|---|---|---|
| 5,476,888 | A | * | 12/1995 | Eiffler et al. | 524/123 |
| 5,705,074 | A | | 1/1998 | Brient | |
| 6,306,953 | B1 | * | 10/2001 | Fortuyn et al. | 524/508 |

FOREIGN PATENT DOCUMENTS

| DE | 195 10063 | | 3/1995 |
|---|---|---|---|
| DE | 9510063 | A1 | 9/1996 |
| EP | 0758636 | A1 | 2/1997 |

* cited by examiner

*Primary Examiner*—Terressa M Boykin

(57) ABSTRACT

The present invention provides a method for treating water containing phenolic material such as bisphenol A, phenol, para tertiary butyl phenol, and 1,1,1-tris(hydroxyphenyl) ethane, as well as water soluble polycarbonate oligomers, and dispersed polycarbonate particles by extracting the phenolic material from the water using a water immiscible organic liquid containing an amine coupling catalyst. The treated water is then steam stripped to remove residual organic liquid and the amine. The organic liquid, containing the bisphenol A, phenol, para tertiary butyl phenol, and 1,1,1-tris(hydroxyphenyl)ethane, as well as water soluble polycarbonate oligomers and dissolved polycarbonate particles can be fed back to the coupling step of the polycarbonate process without further regeneration or treatment.

5 Claims, 1 Drawing Sheet

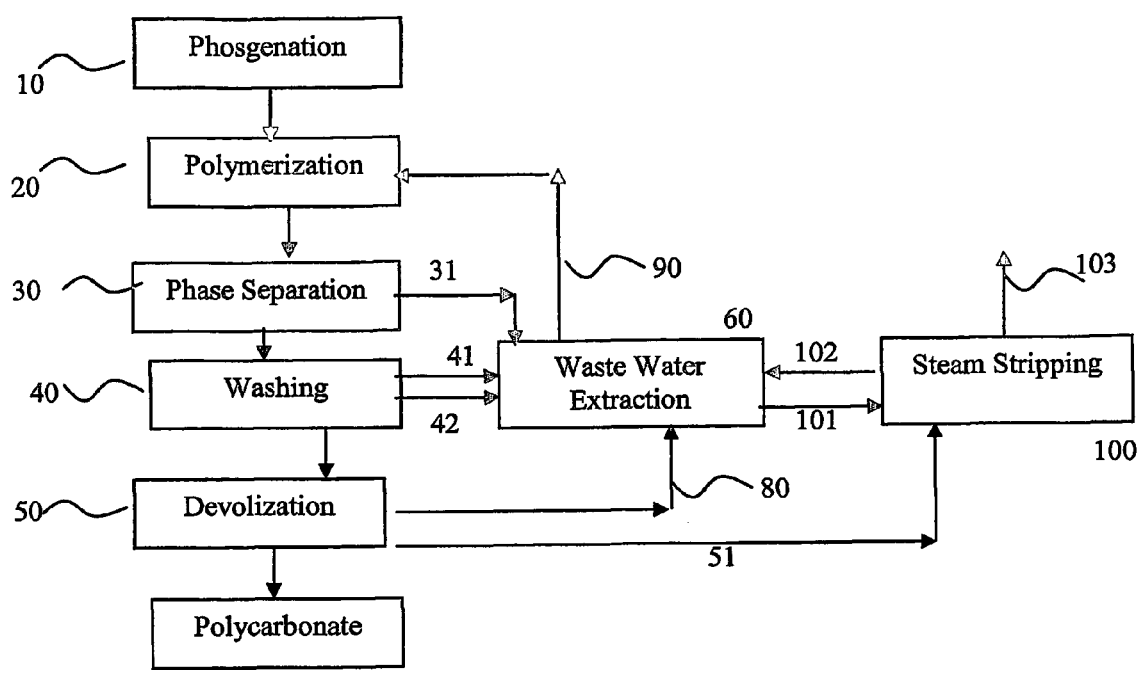

METHOD FOR PURIFYING WASTEWATER

CROSS REFERENCE STATEMENT

This application claims the benefit of U.S. Provisional Application No. 60/452,442, filed Mar. 5, 2003.

BACKGROUND OF THE INVENTION

1. Field of the Invention

This invention relates to a method for treating wastewater and more specifically, to a method for treating wastewater containing phenolic compounds and dispersed polycarbonate particles from an interfacial polycarbonate manufacturing process.

2. Description of Related Art

In one method for the preparation of polycarbonate, bisphenol A is reacted with phosgene using a two-phase reaction mixture. Using this interfacial polycondensation technique, one phase is an aqueous, alkaline phase and the other phase is an organic liquid phase. In this method, bisphenol A is typically dissolved as a salt (for example, sodium bisphenolate) in the aqueous phase and phosgene is dissolved in the organic phase. The organic phase generally comprises a chlorinated hydrocarbon such as dichloromethane as the organic liquid, reaction medium. The phosgene and bisphenol react at the interface of the two phases to produce carbonate oligomers with reactive chloroformate end groups which enter the organic phase while the salts formed by the reaction (for example, NaCl and $Na_2CO_3$) enter the aqueous phase of the reaction mixture.

After formation of carbonate oligomers with reactive endgroups, a catalyst, typically a tertiary aliphatic amine such as triethylamine, is added to accelerate polycondensation of oligomers to higher molecular weight products in a so-called coupling step. Monofunctional phenols may also be added to the reacting mixture during or after the phosgenation or in the coupling step to control molecular weight. Multifunctional phenols may also be added to the polymerization process to act as a branching agent.

After the polycondensation reaction, the aqueous phase is separated from the organic phase and the organic and aqueous phases subsequently treated. Typically, the organic phase is treated by washing with a dilute acid such as hydrochloric or phosphoric acid, to extract the amine coupling catalyst into the acid. Electrolytes are then removed from the organic phase by washing with demineralized water. The wash water used in this washing step requires subsequent purification prior to reuse or disposal.

The aqueous phase is conventionally purified by stream stripping to remove residual solvent and the coupling catalyst and then treated to remove residual amounts of polymer, water soluble polycarbonate oligomers, polycarbonate particles and/or bisphenol such as in a biological wastewater facility or by absorption with activated carbon or ion-exchange resins.

Unfortunately, the phenolic materials are relatively resistant to biological reactions. Thus, relatively long times are required in the biological waste treatment units. In addition, purification by adsorption is limited by the adsorption capacity of the activated carbon for phenolic bodies. The regeneration of the carbon is difficult. In addition, water soluble polycarbonate oligomers often cannot be removed by activated carbon. The use of ion exchange resins is limited by the fact that the wastewater contains other salts such as sodium chloride and sodium carbonate in relatively high concentrations. In addition, small polycarbonate particles are not effectively removed by the adsorption or ion-exchange methods.

An alternative method for removing phenolic bodies from the water is an extraction method described in DE 195 10063. In this patent, the described extraction uses an amine dissolved in a hydrocarbon or a mixture of hydrocarbons. The process includes a regeneration step of the hydrocarbon phase by alkaline extraction. However, additional regeneration steps are required to separate the extracted phenolic bodies from the amine solution. In addition, the extraction method using a hydrocarbon is not suitable to remove polycarbonate particles, dispersed in the water phase, as polycarbonate is nearly insoluble in hydrocarbons.

It remains desirable to purify the water used in the preparation of polycarbonate using more effective means.

BRIEF SUMMARY OF THE INVENTION

In a first embodiment, the present invention is a method for removing the phenolic materials from water. In this method, water containing the phenolic material is treated with a water immiscible organic liquid containing an amine coupling catalyst to at least partially remove the phenolic materials and the treated water stream is then stripped to remove residual organic liquid and amine.

This method is useful for treating the water used in the aqueous phase of an interfacial, polycarbonate manufacturing, process and/or the wash water used to remove inorganic and organic impurities (for example, the bisphenolate) from the organic phase of the interfacial, polycarbonate manufacturing process. When either or both of these water mixtures are washed with a water immiscible solvent containing an amine coupling catalyst, the phenolic materials are removed (extracted) into the solvent wash.

Specifically, the aqueous phase used in the interfacial, polycarbonate manufacturing, process generally contains salts such as sodium chloride and sodium carbonate, and phenolic materials (for example, bisphenol, phenolic terminator, phenolic branching agent, water soluble polycarbonate oligomers and/or polycarbonate particles), as well as being saturated with the immiscible, organic liquid, reaction medium. The wash water used to wash the organic liquid, reaction medium will also contain traces of phenolic materials, normally in the form of a salt, for example, sodium bisphenolate, as well as the coupling catalyst and the organic liquid. When either or both these water mixtures are washed with a water immiscible solvent containing the coupling catalyst, the phenolic materials are removed (extracted) into the solvent wash. Therefore, the method of the present invention can be used to treat both the water used in the aqueous phase of the reaction mixture and the wash water, either simultaneously or separately.

Alternatively, any water containing phenolic materials including, if present, dispersed polycarbonate particles, can be treated using this method.

The amount of the phenolic materials removed by the water immiscible solvent containing the amine coupling catalyst can be sufficient to reduce the concentration of phenolic materials to levels such that further purification to remove additional phenolic compounds, including any water soluble polycarbonate oligomers or dispersed polycarbonate particles, is not required. Thus, after steam stripping, the purified water can be fed to brine wells of a chlor-alkali electrolysis process or discharged into a salt-water environment. The water immiscible solvent containing the phenolic components, the amine coupling catalyst and residual organic liquid can be recycled to the interfacial polycarbonate reaction mixture.

The method of the present invention avoids the need for treatments such as purification in a biological wastewater facility or adsorption with activated carbon or ion exchange resins. In addition, while additional or different materials can be employed, the method of the invention can be operated using only materials employed in the interfacial, polycarbonate manufacture. Even more advantageous is the fact that the water, once treated can be used in other chemical processes such as the chlor-alkali electrolysis unit or fed to a brackish or salt-water environment. In addition, the organic liquid reaction medium, coupling catalyst and extracted phenolic materials can be recycled to the interfacial, polycarbonate manufacturing, process (for example, to the coupling step) without further regeneration or treatment. The phenolic materials can be reacted in the coupling reaction to become integrated into the polymer chains.

In a second embodiment, this invention is an improved method for preparing polycarbonate by an interfacial, polycondensation reaction with the steps of:

(1) reacting phosgene and a bisphenol using a two-phase reaction mixture to form carbonate oligomers; the reaction mixture comprising an aqueous, alkaline phase and an immiscible organic phase, with the phosgene being dissolved in the organic phase and the bisphenol dissolved as a salt in the aqueous phase;

(2) subsequently reacting the carbonate oligomers in the presence of a coupling catalyst to form a polycarbonate;

(3) separating the aqueous and organic phases; the aqueous phase containing salts formed as by-products of the reaction of bisphenol and phosgene as well as organic liquid and bisphenol components and the organic phase containing the coupling catalyst and polycarbonate product;

(4) treating the separated organic phase with a wash water solution of an acid to remove the amine coupling catalyst and then with an aqueous liquid to remove inorganic impurities; and (5) recovering the solid polycarbonate;

wherein the improvement comprising the steps of:

(a) treating either or both the separated aqueous phase obtained in step (3) and/or the wash water obtained in step (4) with an organic solution of an amine coupling catalyst to extract the bisphenol and other phenolic components as well as any water soluble polycarbonate oligomers and dispersed polycarbonate particles; and (b) steam stripping the aqueous solutions treated in (a) to remove the organic liquid and the amine coupling catalyst.

Optionally, the organic liquid, coupling catalyst and bisphenolic components used in step (a) are recirculated to the reaction (2).

BRIEF DESCRIPTION OF DRAWINGS

FIG. 1 illustrates a flow chart for one embodiment of the method of the present invention.

DETAILED DESCRIPTION OF THE INVENTION

The present invention is a method for the treatment of water containing phenolic materials, particularly the water used in the aqueous phase of an interfacial, polycarbonate production, process and/or the wash water used to treat the organic phase used in this process.

FIG. 1 illustrates, in the form of a flowchart, one embodiment of the present invention. In the illustrated embodiment, the phosgenation reaction is conducted in step 10 followed by polymerization in step 20.

In the phosgenation reaction 10, phosgene dissolved in the water immiscible organic liquid is reacted with a sodium salt of bisphenol, commonly bisodium bisphenol A, to form carbonate oligomers having reactive chlorformate end-groups. The organic liquid is typically a chlorinated hydrocarbon such as dichloromethane although other organic liquids such as ethers, esters or ketones can be employed. The phosgene is normally employed in stoichiometric excess, typically 10 to 40 percent excess, in relation to the bisphenol. During phosgenation, the aqueous phase of the two phase reaction mixture is generally at an alkaline pH, preferably from 9 to 14, and contains a bisphenol material, commonly a bisphenolate salt such as a salt of bisphenol A, for example, sodium bisphenolate. The phenolate is dissolved in an amount from 10 to 25 weight percent based on the total weight of aqueous solution.

The aqueous phase will also typically contain a chain terminator such as a sodium salt of a monofunctional phenolic compound, for example, phenol or 4-tert-butylphenol, and a branching agent such as the sodium salt of a multifunctional phenolic compound. The chain terminator and branching agent may be added before or coincident with the coupling catalyst.

During the phosgenation reaction, salts such as sodium chloride and sodium carbonate are formed and dissolve in the aqueous phase. The carbonate oligomers formed enter the organic phase.

Following the desired phosgenation, a coupling catalyst typically, a tertiary aliphatic amine such as triethylamine, tripropylamine, or tributylamine, is added to the reaction mixture. A cyclic tertiary amine, such as dimethyl pyridine, may also be used as the coupling catalyst. The reactive carbonate oligomers are polymerized in the presence of the coupling catalyst during polymerization step 20.

Referring once again to FIG. 1, following the desired completion of the phosgenation reaction, the aqueous phase and the organic phase are separated in step 30. Techniques that effectively separate the two phases are well known and can be employed in the practice of this invention. The specific conditions and techniques using for this separation are not critical to the practice of this invention and any of the described can be employed. The separation is normally and preferably conducted using centrifugation.

In the embodiment depicted in FIG. 1, the separated aqueous phase 31 (for purposes of describing this invention, this will be referred to as wastewater) is fed to a wastewater extraction step 60. The wastewater contains salts made during the phosgenation reaction, typically NaCl and $Na_2CO_3$ but also contains traces of the organic liquid, reaction medium as well as bisphenol and/or other phenolic compounds.

The specific materials in the separated aqueous phase and their amounts will depend on the raw materials and reaction conditions employed in the reaction. The phenolic compounds or components are typically bisphenol as well as carbonate oligomers and polymers. Other phenolic compounds may include phenol, para tertiary butylphenol, 1,1,1-tris(hydroxyphenyl)ethane and chlorinated, brominated, or methylated bisphenols. The separated aqueous phase will also be saturated with the organic, reaction, liquid and contain small amounts, for example, less than 0.1 weight percent, of the coupling catalyst. In addition, it may also contain small amounts of the phenolic terminator (for example, phenol), comonomers, if employed, and branching agents.

The separated organic phase will contain the organic, reaction, solvent, polycarbonate product as well as the coupling catalyst and bisphenolate salt, typically sodium bisphenolate. The coupling catalyst is generally in amounts of from 0.05 to 1 weight percent based on the total weight of the separated organic phase. The residual amounts of the bisphenolate salt (for example, sodium bisphenolate) are generally less than 0.1 weight percent.

The separated organic phase is washed in step 40. Techniques to wash the organic phase are well known in the art, not critical to the practice of this invention, and reference is made thereto for the purposes of this invention. Typically, the organic phase is washed with a dilute acid (for example, from 0.5 to 30 weight percent hydrochloric or phosphoric acid solution) to extract the amine coupling catalyst; followed by one to five wash steps with pure water. These water washes are generally performed in a sequence of conventional mixer-settler systems separators such as rotary mixers and liquid-liquid centrifuges or centrifugal extractors.

In the embodiment depicted in FIG. 1, the acidic wash water 41 and wash water(s) 42 are fed to the waste extraction 60. The water wash(es) 42 following washing, contain phenolic compound, the coupling catalyst and, typically, traces of organic liquid, water soluble polycarbonate oligomers and dispersed polycarbonate particles.

Following washing, the polycarbonate is isolated from the organic phase in a recovery step 50 using techniques well known in the art such as devolitization (that is, steam evaporation of the solvent, or evaporation of the solvent in an extruder), or precipitation with a nonsolvent for the polycarbonate such as hexane or like means. Water 51 from step 50, which is generally saturated with the organic liquid reaction medium, is preferably fed back to different points of the process such as the wash section or, as depicted in the illustrated embodiment, the steam stripper 100.

In the embodiment of the present invention illustrated in FIG. 1, the wastewater 31 and the wash waters 41 and 42 are simultaneously treated in the extraction step 60 to remove the phenolic material. While FIG. 1 depicts simultaneous treating of both the wash waters 41 and 42 and the wastewater 31, it is possible, although not as advantageous, to treat either the wash waters 41 and 42 or the wastewater phase 31 without treating the other or treating the wash waters 41 and 42 and the wastewater 31 separately.

In the extraction step 60, the wash water(s) and/or wastewater are treated with an organic liquid in the presence of a coupling catalyst for the polymerization of the phosgenated bisphenol.

Conveniently, for ease of further processing and as shown in FIG. 1, the organic liquid used to the treat the wash water and/or wastewater is the organic liquid used in the organic reaction phase 80 removed in the devolatization step 50. Similarly, the coupling catalyst is preferably the same coupling catalyst as used in the reaction and as depicted in FIG. 1, this catalyst will be in acidic wash water 41. Thus, in the depicted embodiment, the coupling catalyst may not need to be added to the extraction step 60. However, in alternative embodiments, it may be desirable or necessary to add the coupling catalyst or additional amounts of the coupling catalyst to the water being treated or to the organic liquid used for the extraction.

In the extraction step 60, the phenolic materials, and any water soluble oligomers, and dispersed polycarbonate particles are removed from the wash water and wastewater by extraction with the organic liquid containing the amine coupling catalyst. The organic liquid, coupling catalyst and extracted or removed phenolic materials are recycled 90 to the reaction mixture, such as shown in FIG. 1, polymerization step 20. The treated water, which contains organic liquid as well as traces of the coupling catalyst, is fed 101 to steam stripping step 100. In the steam-stripping step, the organic liquid(s) and the coupling catalyst are removed from the treated wash and wastewater 101 and, in the depicted embodiment, water removed in step 51.

As shown in the embodiment of FIG. 1, the removed organic liquid and coupling catalyst are recycled back 102 to the wastewater extraction step 60. Alternatively, the removed organic liquid and coupling catalyst can be recycled, in whole or in part, directly to the reaction mixture, preferably the polymerization reaction 20. The purified water 103 is disposed of such as by feeding it to a brinewell of a chlor-alkali electrolysis process or into a salt-water environment.

In an alternative embodiment, the acidic wash water 41 containing the amine coupling catalyst, which is in the form of a hydrochloride, is not mixed with the other waste water streams but is treated with caustic or other suitable basic material to adjust its pH to 12 or higher and free the amine. Dichloromethane or other suitable organic liquid is then added to the alkaline mixture to form a mixture of an organic liquid phase containing the amine type coupling catalyst. This mixture can then be fed to the extraction device 60.

As indicated in the embodiment depicted in FIG. 1, by the method of the present invention, the wastewater 31, wash waters 41 and 42, and the aqueous organic liquid are effectively treated for disposal and the other components used in the process recycled.

With regard to the various steps shown in the embodiment of FIG. 1, phosgenation and polymerization can be conducted by conventional techniques well known in the art. For example, these techniques, including the process conditions and raw materials, are generally exemplified in Ullmann's Encyclopedia of Industrial Chemistry, 5$^{th}$, Completely Revised Edition, Volume 21A: Plastics, Properties and Testing to Polyvinyl Compounds, pages 210 and 211. The specific conditions and techniques using in the oligomerization and polymerization of the interfacial, polycarbonate production, method are not critical to the practice of this invention and essentially any of the interfacial, polycarbonate, polycondensation techniques exemplified in the cited references can be employed.

The polycarbonate production (both phosgenation and polymerization) can be carried out in a batchwise or continuous fashion. Batchwise production is conducted in a stirred tank whereas the more preferred continuous technique typically makes use of a series of stirred tanks or one or more tubular reactors. In general, phosgenation and polymerization are conducted in the same reactor vessel or without any intermediate purification or other steps between the phosgenation or polymerization reaction.

With respect to the extraction step 60, the organic extraction liquid containing the coupling catalyst and aqueous liquid containing the phenolic components are contacted at conditions to extract or remove the phenolic components from the aqueous liquid to the organic liquid. In general, the extraction is conducted at pH of from 2 to 13. While the waste or wash water will typically have such a pH; a basic or acidic material can be added to achieve the desired pH. The extraction is preferably conducted at a pH of between 6 and 11. While the extraction may work at temperatures above the freezing and below the boiling point of the waste or wash water, temperatures from 10 to 40° C. are generally more useful, with ambient temperature (that is, from 20 to 30° C.) being preferred. The extraction is preferably conducted at pressures from ambient up to 12 bar.

As mentioned, in the extraction step, the organic extraction liquid and the coupling catalyst employed are preferably the same as the organic liquid and coupling catalyst used in the reaction. However, other organic liquids can be employed in the extraction step of this invention, including any organic liquid that dissolve at least a portion of the amine coupling catalyst and is capable of extracting (in conjunction with the coupling catalyst) the phenolic components, and water soluble polycarbonate oligomer(s), and dispersed polycarbonate particles present. The preferred organic wash liquids are halogenated, most preferably chlorinated hydrocarbons such as dichloromethane, dichloroethane, dichloropropane, tetrachloromethane; with dichloromethane being most preferred. The preferred coupling catalysts for use with the organic wash liquid are tertiary aliphatic amines, such as such as triethylamine, tripropylamine or tributylamine with triethylamine being most preferred. However, cyclic tertiary amines as dimethylpyridine may also be used.

The amount of the coupling catalyst most advantageously employed in the extraction step will depend on a variety of factors including the specific organic extraction liquid and coupling catalyst employed, the aqueous solution being treated and the desired purity to be achieved. In general, the organic extraction liquid will comprise from 0.25 to 25, preferably from 2.5 to 15, most preferably from 5 to 10, weight percent of the coupling catalyst based on the total weight of the organic liquid and the coupling catalyst.

Most preferably, the organic extraction liquid is dichloromethane and comprises from 5 to 10 weight percent triethylamine.

The extraction can be performed in extraction columns or centrifugal extractors. The extraction is advantageously conducted in a Podbielniak centrifugal extractor. Other equipment conventionally used for extraction purposes such as mixer-settler devices in which agitators, rotary pumps, shear valves or the like provide the mixing; and gravimetric settling, coalescers, hydrocyclones or liquid/liquid centrifuges may also be employed. The extraction is advantageously conducted in a liquid-liquid centrifuge. The extraction can be conducted in a single step or multi-step extraction. In general, this will depend on the level of phenolic components, water soluble oligomer(s), and dispersed polycarbonate particles in the aqueous liquid and the desired purification (that is, the desired purity of the treated water) with multi-step extraction being used when the aqueous liquid contains relatively larger concentrations of the phenolic components, water soluble oligomers, dispersed polycarbonate particles and/or a higher purity is required.

While extraction would normally be conducted in a countercurrent fashion with the aqueous liquid flowing counter to the flow of the organic, extraction, solution; cross flow or even cocurrent extraction is possible. Countercurrent extraction is preferred. Extraction is continued until the level of phenolic components, water soluble oligomers, dispersed polycarbonate particles in the aqueous liquid is desirably low. In general, extraction is continued until the of phenolic components, water soluble oligomers, dispersed polycarbonate particles are less than 100 parts per million (ppm), preferably less than 10 ppm, more preferably less than 1 ppm and most preferably less than 0.05 ppm.

After the extraction step, the treated aqueous liquid is further treated to remove the coupling catalyst and organic liquid. This is conveniently conducted using steam stripping. Steam stripping is a technique well known in the art and reference is made thereto for the purposes of this invention. It is conducted at conditions to remove the remaining organic liquid and coupling catalyst in the form of vapor from the aqueous liquid. Typically, the steam stripping operation is conducted by exposing the aqueous liquid to steam at a temperature of from 100 to 200° C. The organic liquid and coupling catalyst vaporized in the steam stripping operation are then condensed. The condensed materials are advantageously fed to the extraction step 60 or directly to the polymerization step 20.

Following steam stripping, the aqueous phase, is disposed. Provided concentration of phenolic components, water soluble oligomers, dispersed polycarbonate particles is sufficiently small, the aqueous phase can be released to a salt containing environment such as the sea or brackish water or brine wells without further treatment. Alternatively, the aqueous liquid can be used in other operations such as chlor-alkali electrolysis.

The following examples are presented to illustrate the invention and should not be construed to limit its scope. All percentages and parts are by weight unless otherwise indicated.

EXAMPLE 1

Following preparation of a polycarbonate by reacting phosgene with bisphenol A using an interfacial polycondensation technique using dichloromethane as the organic solvent and triethylamine as the coupling catalyst, the aqueous liquid phase is separated from the organic liquid phase. It is analyzed to have a pH of 10.6 and to contain 5 percent sodium chloride, 1 percent sodium carbonate and 88 ppm of bisphenol A. To 200 milliliters (ml) of this aqueous liquid is added 20 ml of dichloromethane that contains 5 weight percent of triethylamine. The resulting mixture is agitated for thirty minutes after which the aqueous and organic phases are separated gravimetrically. The bisphenol A in the aqueous phase was found to have dropped to 48 ppm (the distribution coefficient, which is the ratio of the equilibrium concentration of bisphenol A in the organic phase to that in the aqueous phase, being 8.3.)

EXAMPLE 2

An aqueous liquid having the same composition as that of Example 1 except containing 1 weight percent sodium hydrogen carbonate rather than 1 weight percent sodium carbonate was treated in the same manner as Example 1. The pH of this aqueous liquid is 8.16. The bisphenol A in the treated aqueous phase was found to have dropped to 9.6 ppm (distribution coefficient of 81.4).

EXAMPLE 3

The procedure set forth in Example 1 and 2 was repeated except that the aqueous liquid contained neither sodium hydrogen carbonate nor sodium. The pH of this aqueous liquid is 7.8. The bisphenol A in the treated aqueous phase was found to have dropped to 36 ppm (distribution coefficient of 14.3).

EXAMPLE 4

Following preparation of a polycarbonate by reacting phosgene with bisphenol A using an interfacial polycondensation technique and dichloromethane as the organic solvent and triethylamine as the coupling catalyst, the aqueous liquid phase separated from the organic liquid phase is analyzed to have a pH of 10.8 and to contain 5 percent sodium chloride, 1.24 percent sodium carbonate and 94.9 ppm of bisphenol A.

This aqueous liquid is extracted nine times, each extraction being conducted in the same manner as set forth in Example 1 with fresh solution of dichloromethane and triethylamine being used for each extraction. The concentration of bisphenol A after each extraction step is set forth in the following table:

| Extraction Step | Bisphenol A concentration (ppm) |
|---|---|
| Original | 95.0 |
| 1 | 53.0 |
| 2 | 25.3 |
| 3 | 15.9 |
| 4 | 7.0 |
| 5 | 3.5 |
| 6 | 2.3 |
| 7 | 1.1 |
| 8 | 0.5 |
| 9 | 0.3 |

As indicated by Examples 1-4, the concentration of the phenolic components (in this case, bisphenol A) is effectively reduced by extraction using an organic solution of the coupling catalyst.

The invention claimed is:

1. An improved method for preparing polycarbonate by an interfacial, polycondensation reaction with the steps of:
   (a) reacting phosgene and a bisphenol using a two-phase reaction mixture to form carbonate oligomers; the reaction mixture comprising an aqueous, alkaline phase and an immiscible organic phase, with the phosgene being dissolved in the organic phase and the bisphenol dissolved as a salt in the aqueous phase;
   (b) subsequently reacting the carbonate oligomers in the presence of a coupling catalyst to form a polycarbonate;
   (c) separating the aqueous and organic phases; the aqueous phase containing salts formed as by-products of the reaction of bisphenol and phosgene as well as organic liquid and one or more phenolic material(s), including water soluble polycarbonate oligomers and polycarbonate particles, and the organic phase containing the coupling catalyst and polycarbonate product;
   (d) treating the separated organic phase with an acidic wash water solution to remove amine coupling agent and then with aqueous liquid to remove inorganic impurities;
   (e) recovering the polycarbonate product;
   wherein the improvement comprises
      (i) treating either or both the separated aqueous phase obtained in step (c) and/or the wash water obtained in step (d) with an organic solution of the coupling catalyst in a halogenated organic liquid to extract the phenolic materials; and
      (ii) steam stripping the aqueous solutions treated in step (i) to remove the organic liquid and coupling catalyst.

2. The method of claim 1 wherein the phenolic material comprises bisphenol, a mono functional phenolic terminator, and/or a multifunctional phenolic branching agent; the coupling catalyst is a tertiary aliphatic amine or cyclic amine; and the organic liquid is a chlorinated hydrocarbon.

3. The method of claim 1 wherein the phenol comprises bisphenol A, para tertiary butyl phenol, and 1,1,1tris(hydroxyphenyl)ethane the coupling catalyst is triethylamine, and the organic liquid is dichloromethane.

4. The method of claim 1 wherein the phenolic containing water is contacted with the water immiscible, organic liquid containing a coupling catalyst using countercurrent extraction.

5. The method of claim 1 further comprising the step of recirculating the organic liquid, coupling catalyst and/or phenolic material to the polymerization reaction coupling step (1).

* * * * *